Dec. 22, 1931.  C. C. CRAFT  1,837,655
HEDGE TRIMMER
Filed April 2, 1930  2 Sheets-Sheet 1
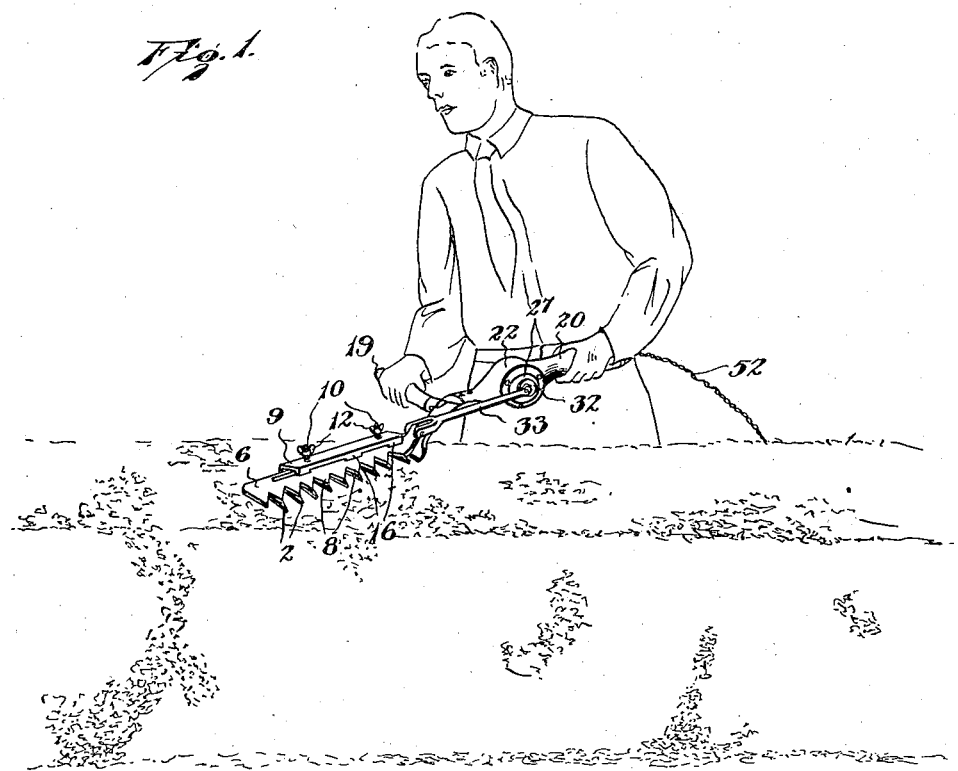
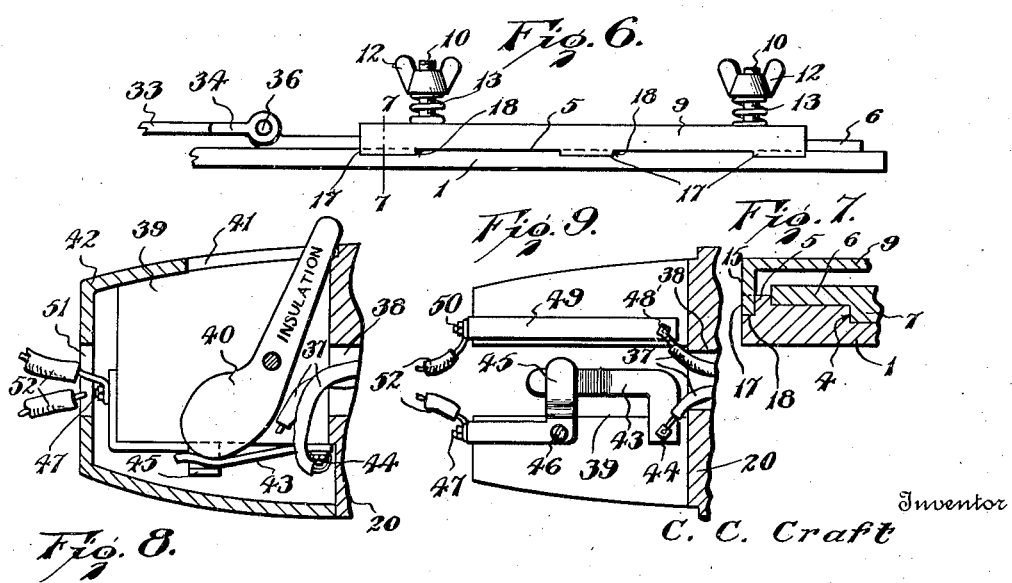
Inventor
C. C. Craft
By Lacey & Lacey, Attorneys Dec. 22, 1931.    C. C. CRAFT    1,837,655
HEDGE TRIMMER
Filed April 2, 1930    2 Sheets-Sheet 2
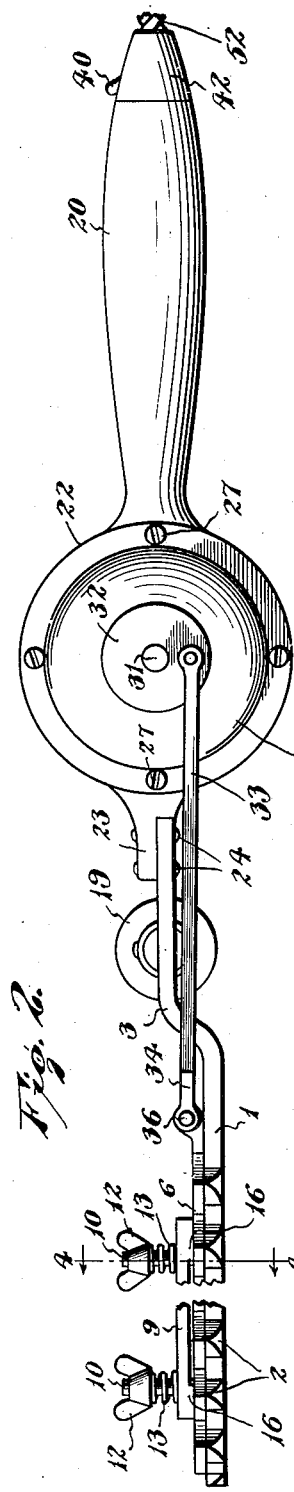
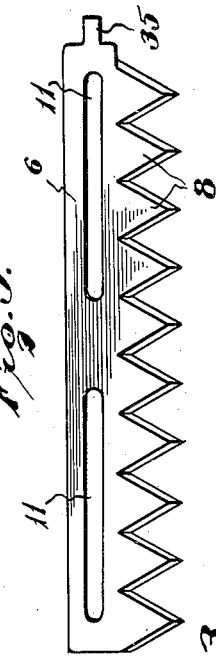
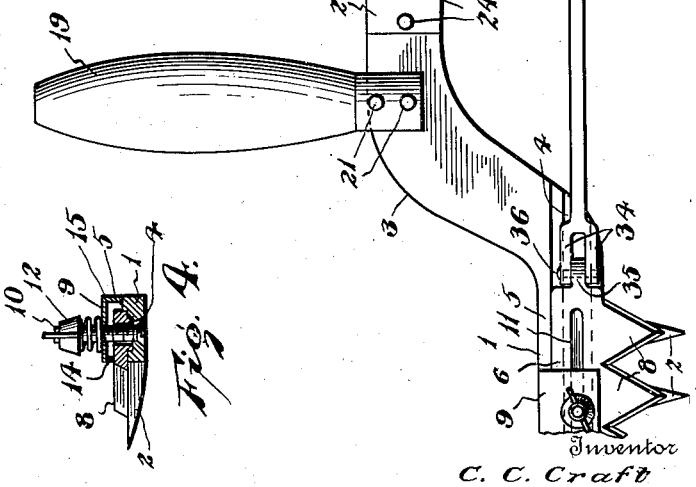
Inventor
C. C. Craft
By Lacey & Lacey, Attorneys Patented Dec. 22, 1931

1,837,655

UNITED STATES PATENT OFFICE

CECIL C. CRAFT, OF PLYMOUTH, NORTH CAROLINA, ASSIGNOR OF ONE-HALF TO AMBROSE L. OWEN, OF PLYMOUTH, NORTH CAROLINA

HEDGE TRIMMER

Application filed April 2, 1930. Serial No. 441,137.

This invention relates to hedge trimmers and more particularly to a trimmer adapted to be operated through the medium of an electric motor thereby allowing a hedge to be easily and quickly trimmed.

One object of the invention is to provide a hedge trimmer which is small and light in weight thereby permitting it to be easily carried and operated by one person.

Another object of the invention is to so dispose the handles with respect to cutting means and an operating motor that the weight will be evenly distributed thereby allowing the trimmer to be very easily handled and moved along or across a hedge as the hedge is trimmed.

Another object of the invention is to provide a device of this character in which its operating motor is mounted in a pocket formed in one of the handles where it will be shielded from damage and to so mount the motor in the pocket that it will be firmly held in place but at the same time permitted to be removed when repairs or adjustments are necessary.

Another object of the invention is to so form a sickle bar and cutter bar or movable blade that the cutter bar may have sliding movement longitudinally of the sickle bar and be guided during its movement and further to provide improved means for urging the cutter bar towards the sickle bar and retaining these bars in close contacting engagement with each other and cause a good cutting action to take place when the trimmer is in use.

Another object of the invention is to permit the cutter bar or movable blade to be easily released when sharpening is necessary.

Another object of the invention is to provide the trimmer with a control switch for its motor so associated with one handle that the switch may be very easily turned on or off and at the same time so located that it will not be liable to be accidentally turned off when the trimmer is in use.

The invention is illustrated in the accompanying drawings, wherein

Figure 1 is a perspective view showing the improved hedge trimmer in use,

Fig. 2 is an enlarged view showing the trimmer in front elevation,

Fig. 3 is an enlarged fragmentary view showing the trimmer partially in top plan and partially in longitudinal section, Fig. 4 is a transverse sectional view taken on the line 4—4 of Fig. 2, Fig. 5 is a top plan view of the movable cutter bar, Fig. 6 is a view showing the sickle bar and associated parts in rear elevation, Fig. 7 is a fragmentary sectional view taken on the line 7—7 of Fig. 6, Fig. 8 is a fragmentary sectional view through the rear free end portion of the motor carrying handle illustrating the switch, and Fig. 9 is a view taken at right angles to Fig. 8 showing the switch construction.

The sickle bar 1 of the improved hedge trimmer is formed of strong metal and is preferably of steel so that its forward side edge portion may be cut to form teeth 2 which taper to points at their free ends and are sharpened along their side edges. One end portion of the bar or strip of steel from which the sickle bar is formed is offset transversely to form a shank 3, as shown in Figure 3, and by referring to Figure 2 it will be seen that this shank is bent so that for the major portion of its length it extends in a plane above the sickle bar. The upper face of the sickle bar is formed with a longitudinally extending groove or recess 4 which is preferably of greater width than depth and this groove extends along the sickle bar between the teeth 2 and a rib 5 formed along the rear side edge of the sickle bar. By this arrangement a cutter bar or blade 6 may be set upon the sickle bar with one side edge bearing against the rib 5 and a rib 7 formed along the under face of the blade seated in the groove or recess 4. This inter-engagement of the sickle bar and cutter bar or blade prevents the blade from having movement transversely of the sickle bar and its teeth 8 will be retained in proper relation to the teeth of the sickle bar so that their sharpened side edges may very effectively cut with a scissors like motion when the trimmer is in use. In order to shield the cutter bar and retain it in proper engagement with the sickle bar, there has been provided a strip or shield 9 which extends longitudinally of the cutter bar and is held in place by bolts 10. These bolts pass upwardly through openings formed in the bottom of the recess 4 and through slots 11 formed longitudinally in the cutter bar and their upper end portions pass upwardly through openings formed in the shield and carry winged nuts 12 which bear against coiled springs 13. By this arrangement sliding movement of the cutter bar longitudinally of the sickle bar will be limited and also guided by the bolts and since the springs 13 are placed under tension by tightening the winged nuts pressure will be exerted which forces the shield towards the cutter bar and sickle bar. Flanges 14 and 15 are formed along the front and rear side edges of the shield and carry lugs 16 and 17. The lugs 16 bear against the upper face of the cutter bar between the teeth 8 and slots 11 so that the cutter bar may be urged downwardly and at the same time allowed to slide easily and the lugs 17 engage in seats 18 formed in the rib 5 in order to brace the shield and prevent it from having movement longitudinally of the sickle bar. By this arrangement the cutter bar or blade will be retained in proper position relative to the sickle bar and pressure exerted to cause the twigs to be very easily cut when trimming a hedge and the shield will be prevented from being moved longitudinally of the sickle bar by frictional engagement with the cutter bar.

In order that the operator may very easily hold the device and guide it along and across a hedge, there has been provided handles 19 and 20. The handle 19 extends transversely of the shank and has its inner end riveted or otherwise firmly secured to the shank, as shown at 21. The handle 20 extends longitudinally of the shank and has one end portion enlarged to form a housing or pocket 22 from which extends a lug 23 riveted or otherwise firmly secured to the rear end of the shank, as shown at 24. The housing or pocket 22 is substantially circular when viewed in elevation, as shown in Figure 2, and has one end formed with a stationary head 25 and its other end closed by a cap 26 removably secured to the walls of the housing by screws 27. A motor 28 of a conventional construction fits snugly within the housing and at one end carries threaded studs 29 which project through openings formed in the head 25 and carry securing nuts 30. By this arrangement the motor will be firmly held in place and prevented from working loose. The shaft 31 of the motor projects outwardly through an opening formed centrally of the cap 26 and carries a disk 32 to which is pivotally attached one end of a pitman 33. This pitman is disposed in eccentric relation to the disk 32 and has its other end formed with forks 34 between which an ear 35 at one end of the cutter bar is pivotally secured by a pin 36. It will be readily seen that when the motor is in operation and the disk 32 is rotating with the motor shaft, reciprocating motion will be imparted to the pitman and the cutter bar or blade caused to reciprocate rapidly back and forth along the sickle bar. Therefore, a very good cutting action will take place between the teeth of the sickle bar and cutter bar and a hedge may be very easily and quickly trimmed. It should be noted that since the handle 20 is disposed rearwardly of the motor housing and the handle 19 between the motor housing and cutting mechanism and these handles extend transversely of each other the handles may be very easily grasped, as shown in Figure 1, and the weight will be so distributed relative to the handles that the implement will be evenly balanced and a minimum amount of effort will be required to hold the implement in an operative position and move it along and across a hedge.

The motor is electrically operated and is provided with feed wires 37 passed rearwardly through a bore 38 formed axially of the handle 20. The rear portion or free end of the handle is recessed longitudinally to form a pocket 39 with which the bore 38 communicates and in this recess is pivotally mounted a lever 40 of insulating material which projects outwardly through a slot 41 formed in a cap or ferrule 42 fitting tightly upon the handle. The inner end of the lever bears against a resilient contact strip or terminal 43 to which one of the wires 37 is secured by a fastener 44 serving to hold the terminal in place and by moving the outer end of the lever towards the free end of the handle the contact strip 43 will be forced into engagement with a companion contact strip 45. This contact strip 45 is secured by a fastener 46 and extends along the handle and against the free end thereof where it is secured by a fastener 47. The other wire 37 is secured to a fastener 48 by means of which one end of a conductor strip 49 is secured to the handle at the opposite side of the recess 39 from the contact 45 and this conductor strip has its rear end portion bent to extend along the end of the handle where it is secured by a fastener 50. An opening 51 is formed in the outer end of the ferrule so that power wires 52 may be passed inwardly and these wires are engaged with the fasteners 47 and 50. It will thus be seen that by connecting the wires 52 with a suitable source of electric energy and moving the lever 40 to a closed position in which the contact 43 engages the contact 45 current may be supplied to the motor. Since the switch is located at the rear end of the handle 20, it will not be liable to be accidentally moved from a closed to an open position but at the same time it may be easily reached when it is necessary to shut off the motor.

When this hedge trimmer is in use, the handles are grasped as shown in Figure 1 with the device extending in front of the operator. The implement is applied to the hedge either in a horizontal position as shown in the drawings for trimming the top of the hedge or held in substantially a vertical position for trimming sides of the hedge and since the weight is evenly distributed, as previously explained, the implement may be very easily handled.

Having thus described the invention, I claim:

A hedge trimmer comprising a sickle bar having its rear end laterally offset to provide a shank, the shank being bent to dispose its rear end portion in a plane above the plane of the sickle bar, a cutter bar slidable on the sickle bar, a handle extending longitudinally of the shank and formed at its forward end with a housing open at one side, a lug extending forwardly from said housing and secured to the rear end of said shank, a head for the open side of said housing removably secured thereto, an electric motor in the housing having a shaft extending through said head, a disk fixed upon the outer end of said shaft, a pitman at one side of the shank having its front end pivoted to the cutter bar and its rear end pivoted to said disk whereby reciprocating motion will be imparted to the cutter bar and a handle secured to the shank intermediate its length and extending transversely therefrom at the opposite side thereof from said pitman.

In testimony whereof I affix my signature.

CECIL C. CRAFT. [L. S.]